US007745727B2

(12) United States Patent
Lim et al.

(10) Patent No.: US 7,745,727 B2
(45) Date of Patent: Jun. 29, 2010

(54) ELECTRIC WIRE BRACKET FOR SOLAR CELLS

(75) Inventors: Sang-Hoon Lim, Seo-gu (KR); Young-Heack Kang, Yuseong-gu (KR); Chang-Kyun Yu, Seo-gu (KR); Yil-Sik Cho, Yuseong-gu (KR); Nam-Choon Baek, Yuseong-gu (KR); Gwon Jung Yu, Seocho-gu (KR)

(73) Assignee: Korea Institute of Energy Research, Yuseong-gu (KR)

( * ) Notice: Subject to any disclaimer, the term of this patent is extended or adjusted under 35 U.S.C. 154(b) by 567 days.

(21) Appl. No.: 11/769,387

(22) Filed: Jun. 27, 2007

(65) Prior Publication Data

US 2008/0078440 A1 Apr. 3, 2008

(30) Foreign Application Priority Data

Oct. 2, 2006 (KR) ..................... 10-2006-0097335

(51) Int. Cl.
*H02G 3/06* (2006.01)

(52) U.S. Cl. ........................................................ 174/92

(58) Field of Classification Search ................... 174/92, 174/94 R, 94 S; 136/230, 232, 251; 439/790
See application file for complete search history.

(56) References Cited

U.S. PATENT DOCUMENTS

| | | | | |
|---|---|---|---|---|
| 3,757,031 | A * | 9/1973 | Izraeli | 174/138 F |
| 4,954,670 | A * | 9/1990 | Jensen et al. | 174/92 |
| 7,432,445 | B2 * | 10/2008 | Bird et al. | 174/92 |
| 2004/0173373 | A1 * | 9/2004 | Wentworth et al. | 174/92 |
| 2006/0180196 | A1 * | 8/2006 | Lares et al. | 136/251 |

* cited by examiner

*Primary Examiner*—Neil Abrams
(74) *Attorney, Agent, or Firm*—Oblon, Spivak, McClelland, Maier & Neustadt, L.L.P.

(57) ABSTRACT

Disclosed is an electric wire bracket for solar cells, which includes a pair of upper and lower plates respectively having adhesive layers adhered to each other and grooves facing each other so as to form insertion paths, into which a plurality of electric wires for supplying power produced by solar cells to electronic instruments are inserted, through the connection of the upper and lower plates by adhering the adhesive layers to each other, thus facilitating the connection of the wires.

The electric wire bracket for solar cells includes a lower plate, an upper plate, release papers, and conductive layers, wherein at least one insertion path, into which the electric wires for solar cells are inserted, is formed by connecting the lower plate and the upper plate.

4 Claims, 5 Drawing Sheets

ELECTRIC WIRE BRACKET FOR SOLAR CELLS

BACKGROUND OF THE INVENTION

1. Field of the Invention

The present invention relates to an electric wire bracket, and more particularly to an electric wire bracket for solar cells, which includes a pair of upper and lower plates respectively having adhesive layers adhered to each other and grooves facing each other so as to form insertion paths, into which a plurality of electric wires for supplying power produced by solar cells to electronic instruments are inserted, through the connection of the upper and lower plates by adhering the adhesive layers to each other, thus facilitating the connection of the wires.

2. Description of the Related Art

Generally, power supply systems using solar cells are installed at a place, to which power cannot be easily supplied through an electric wire, and are used as emergency indicators or emergency power supplies. Otherwise, these power supply systems using solar cells are attached to a window so as to conserve energy, and produce electric power, and supply the power to various electronic instruments, such as a lighting device for a picture frame or a wall-mounted fish basin.

A conventional power supply system using solar cells charges a battery with electric power produced by photoelectric conversion through the solar cells, and operates various electronic instruments using the power charged in the battery.

FIG. 7 is a schematic view illustrating one example of the installation of a conventional electric wire for supplying power produced by solar cells. A plurality of solar cells 100 for producing electric power from the rays of the sun are attached to a window 200.

A transformer 400, which transforms the electric power produced from the rays of the sun by the solar cells 100 so as to charge a charging battery 300, is provided at one side of the plurality of the solar cells 100.

Here, the solar cells 100 and the transformer 400, and the transformer 400 and the charging battery 300 are respectively connected by an electric wire 500.

Further, in order to supply the electric power to various electronic instruments, for example a lighting device 700 for a wall-mounted picture frame 600, the charging battery 300 is electrically connected to the lighting device 700 by the electric wire 500.

Here, the charging battery 300 and the lighting device 700 keep a designated distance from each other. Thus, the connection between the charging battery 300 and the lighting device 700 by a single electric wire is out of question. However, in the case that the length of the electric wire 500 for connecting charging battery 300 and the lighting device 700 is short, or the electric wire 500 needs to be branched off so as to supply the power from the charging battery 300 to a plurality of lighting devices 700, a plurality of electric wires must be connected to one another.

In order to connect a plurality of electric wires, insulating sheaths of the respective electric wires are peeled off so as to expose cores of the electric wires, and then the exposed cores are connected. Thereafter, an insulating tape is wound on the connected cores so as not to expose the cores to the outside.

The above connection of the cores of the electric wires is complicated, and an electric short due to incorrect connection may occur. Further, as time passes, the adhesive strength of the insulating tape becomes weak, and may cause a leak of electricity. Moreover, foreign substances may be attached to the insulating tape, thus providing untidy external appearances of the wires.

SUMMARY OF THE INVENTION

Therefore, the present invention has been made in view of the above problems, and it is an object of the present invention to provide an electric wire bracket for solar cells, which includes a pair of upper and lower plates respectively having grooves facing each other, adhesive layers, and conductive parts formed in the grooves so as to electrically connect cores of a plurality of electric wires to the conductive parts, and forms insertion paths, into which the electric wires for supplying power produced by solar cells to electronic instruments are inserted, through the connection of the upper and lower plates by adhering the adhesive layers to each other, thus facilitating the connection of the wires, and being fixable to a wall.

In accordance with the present invention, the above and other objects can be accomplished by the provision of an electric wire bracket for solar cells comprising a lower plate including at least one groove formed across the upper surface thereof and an adhesive layer formed around the groove; an upper plate including at least one groove, facing the groove of the lower plate, formed across the lower surface thereof and an adhesive layer formed around the groove; release papers respectively provided on the upper surface of the adhesive layer of the lower plate and the lower surface of the adhesive layer of the upper plate; and conductive layers, to which cores of electric wires for solar cells, exposed by peeling off sheaths from the wires, are connected, respectively formed in the groove of the lower plate and the groove of the upper plate, wherein at least one insertion path, into which the electric wires for solar cells are inserted, is formed by connecting the lower plate and the upper plate.

The electric wire bracket for solar cells may further comprise a lower adhesive layer formed on the lower surface of the lower plate; and a lower release paper provided on the lower surface of the lower adhesive layer.

The at least one groove may include a plurality of grooves, connected to the conductive layers and facing each other.

At least one through hole for vertically passing a fixture may be formed through the lower plate so that the lower plate can be fixed to a wall using the fixture.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 1:
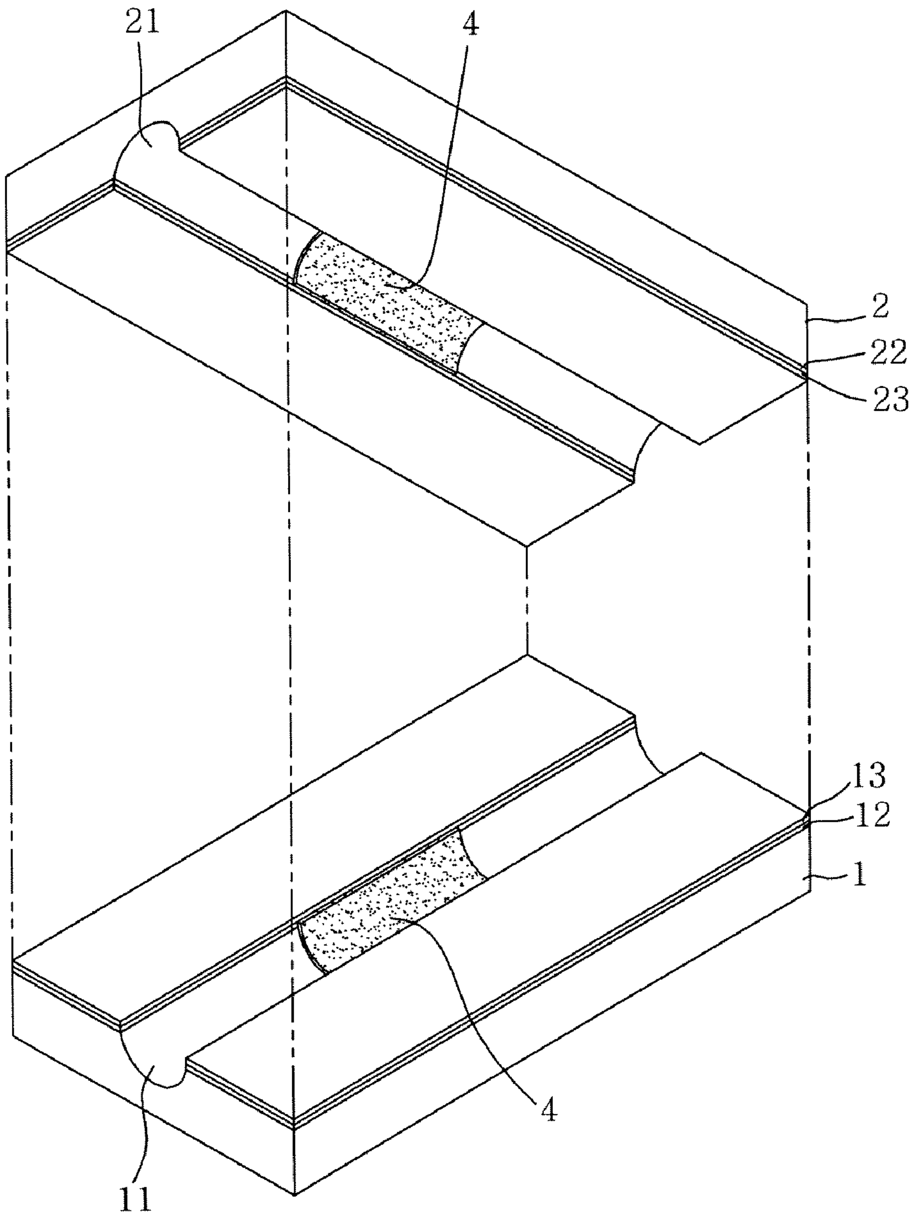
FIG. 1 is an exploded perspective view of an electric wire bracket for solar cells in accordance with a first embodiment of the present invention.
Figure 2:
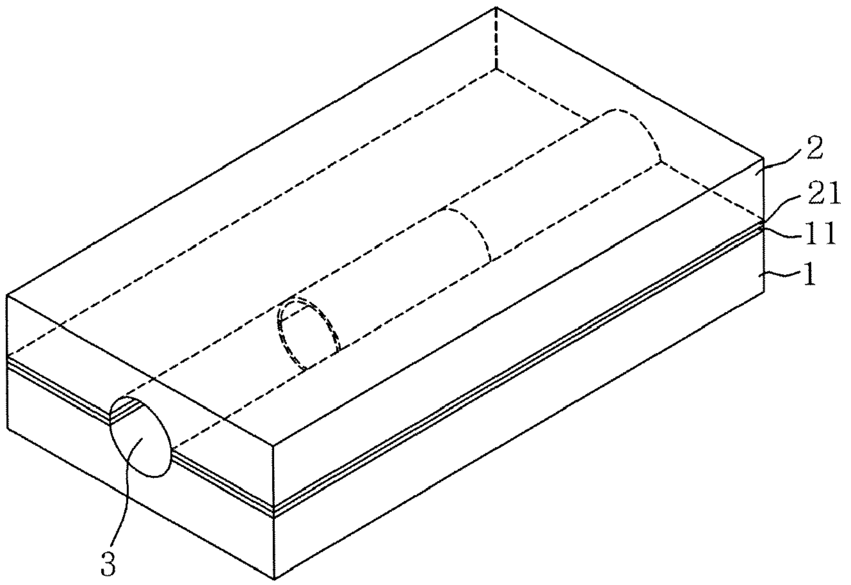
FIG. 2 is a perspective view of the electric wire bracket for solar cells in an assembled state in accordance with the first embodiment of the present invention.

FIG. 1 is an exploded perspective view of an electric wire bracket for solar cells in accordance with a first embodiment of the present invention, and FIG. 2 is a perspective view of the electric wire bracket for solar cells in an assembled state in accordance with the first embodiment of the present invention. The electric wire bracket for solar cells of this embodiment has an insertion path formed by connecting a lower plate 1 and an upper plate 2.

For this reason, a groove 11 is formed across the upper surface of the lower plate 1, and an adhesive layer 12 is formed around the groove 11.

Further, a groove 21 facing the groove 11 of the lower plate 1 is formed across the lower surface of the upper plate 2, and an adhesive layer 22 is formed around the groove 21.

Moreover, release papers 13 and 23 are respectively provided on the upper surface of the adhesive layer 12 of the lower plate 1 and the lower surface of the adhesive layer 22 of the upper plate 2.

Since the adhesive layers 12 and 22 are formed on the lower and upper plates 1 and 2 provided with the grooves 11 and 21 and the release papers 13 and 23 are provided on the adhesive layers 12 and 22, as described above, when the adhesive layers 12 and 22 of the lower and upper plates 1 and 2 are adhered to each other after the release papers 13 and 23 are removed from the adhesive layers 12 and 22, the lower and upper plates 1 and 2 are integrally connected.

A conductive layer 4 is provided in the grooves 11 and 21 of the lower and upper plates 1 and 2 so that cores of electric wires for solar cells exposed by peeling off sheaths from the wires can be connected to the conductive layers 4 in the grooves 11 and 21.

Therefore, when cores of electric wires for solar cells are inserted into the insertion path, the cores of the electric wires are connected to the conductive layers 4, thus being electrically connected.

Figure 3:
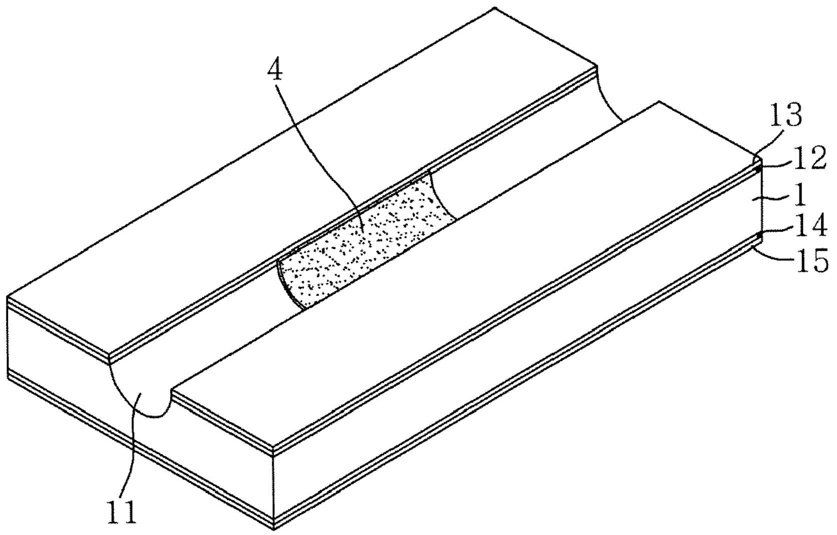
FIG. 3 is a perspective view of a lower plate of an electric wire bracket for solar cells in accordance with a second embodiment of the present invention.

FIG. 3 is a perspective view of a lower plate of an electric wire bracket for solar cells in accordance with a second embodiment of the present invention. Some parts in the second embodiment, which are substantially the same as those in the first embodiment, are denoted by the same reference numerals even though they are depicted in different drawings, and a detailed description of the construction and function thereof will thus be omitted because it is considered to be unnecessary.

With reference to FIG. 3, in the electric wire bracket for solar cells of this embodiment, a lower adhesive layer 14 is formed on the lower surface of the lower plate 1, and a lower release paper 15 is provided on the lower surface of the lower adhesive layer 14.

The electric wire bracket for solar cells of this embodiment further includes the lower adhesive layer 14 and the lower release paper 15 formed on the lower surface of the lower plate 1, and thus can be fixed to a wall by adhering the lower adhesive layer 14 to the wall after the lower release paper 15 is removed from the lower adhesive layer 14.

Figure 4:
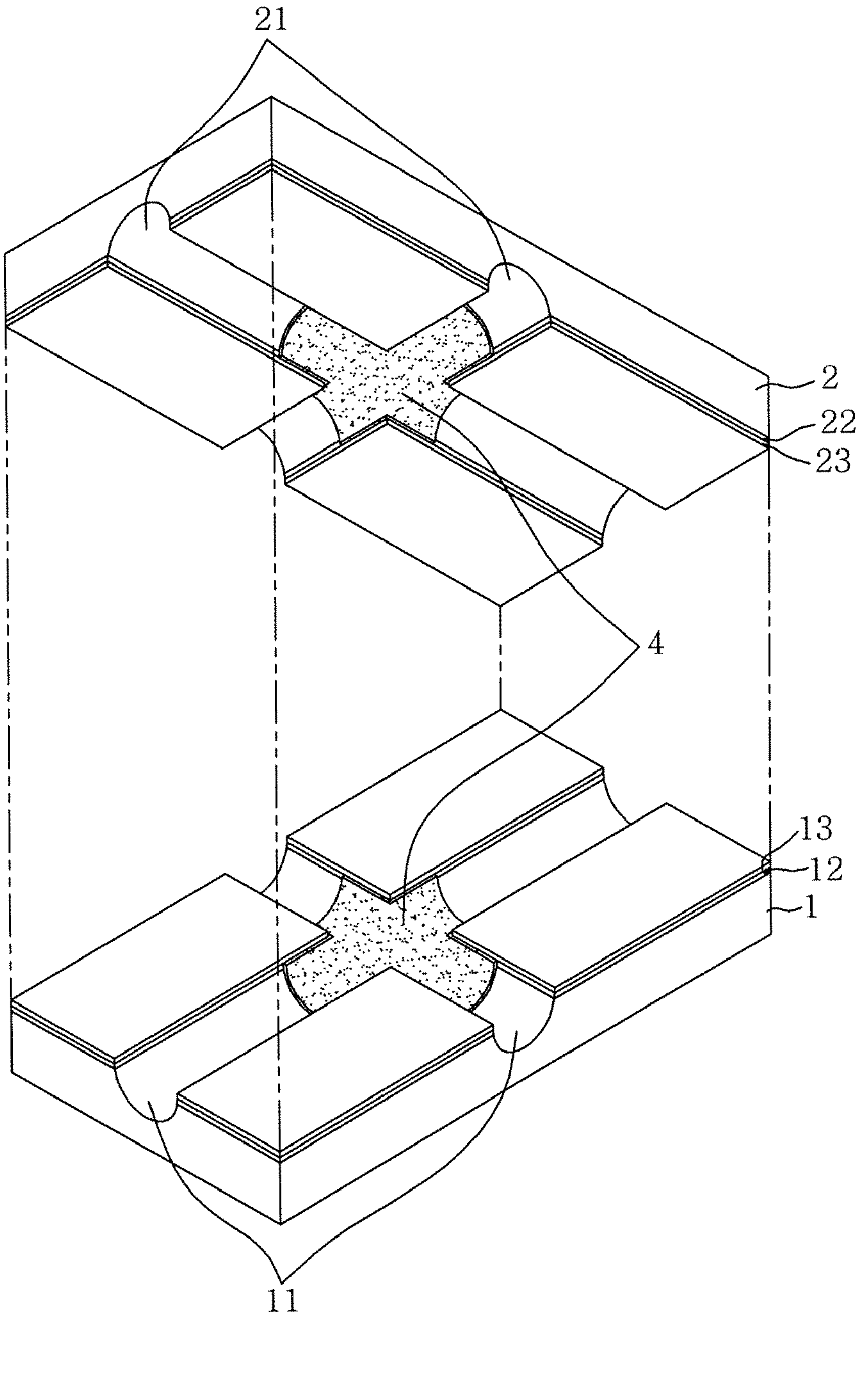
FIG. 4 is an exploded perspective view of an electric wire bracket for solar cells in accordance with a third embodiment of the present invention.
Figure 5:
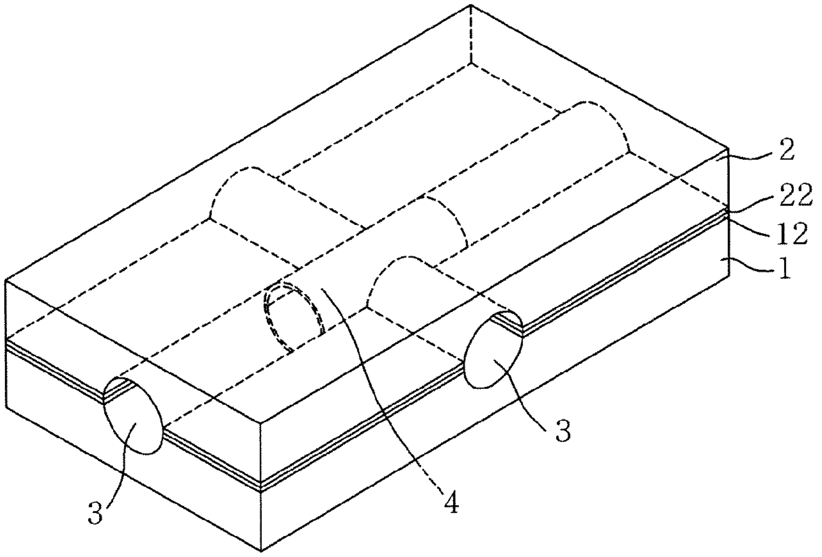
FIG. 5 is a perspective view of the electric wire bracket for solar cells in an assembled state in accordance with the third embodiment of the present invention.

FIG. 4 is an exploded perspective view of an electric wire bracket for solar cells in accordance with a third embodiment of the present invention, and FIG. 5 is a perspective view of the electric wire bracket for solar cells in an assembled state in accordance with the third embodiment of the present invention. Some parts in the third embodiment, which are substantially the same as those in the first and second embodiments, are denoted by the same reference numerals even though they are depicted in different drawings, and a detailed description of the construction and function thereof will thus be omitted because it is considered to be unnecessary.

With reference to FIGS. 4 and 5, a plurality of grooves 11 and 21, which are connected to the conductive layer 4 and face each other, are formed in the lower plate 1 and the upper plate 2.

In accordance with the third embodiment, since the plurality of the grooves 11 and 21, facing each other, are formed in the lower plate 1 and the upper plate 2, when the lower and upper plates 1 and 2 are integrally connected by adhering the adhesive layers 12 and 22 of the lower and upper plates 1 and 2 to each other, a plurality of insertion paths 3, into which cores of electric wires for solar cells exposed by peeling off sheaths from the wires, are formed. Thereby, it is possible to branch off a plurality of wires.

Figure 6:
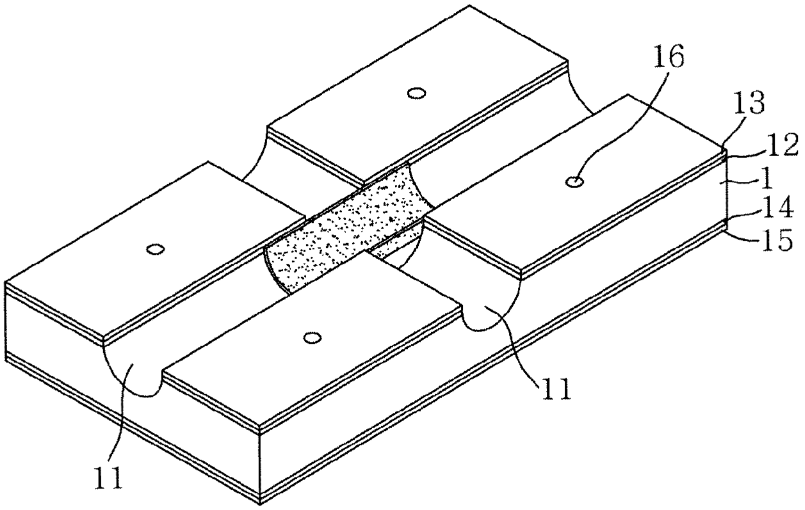
FIG. 6 is a perspective view of a lower plate of an electric wire bracket for solar cells in accordance with a fourth embodiment of the present invention.
Figure 7:
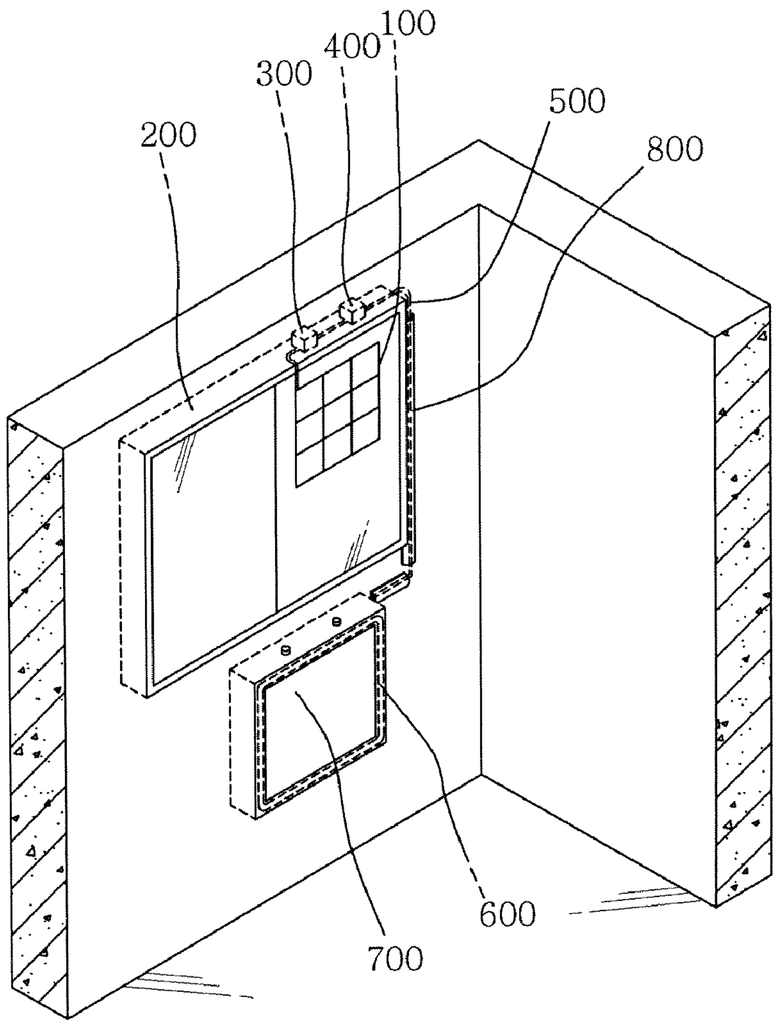
FIG. 7 is a schematic view illustrating one example of the installation of a conventional electric wire for supplying power produced by solar cells.

FIG. 6 is a perspective view of a lower plate of an electric wire bracket for solar cells in accordance with a fourth embodiment of the present invention. Some parts in the third embodiment, which are substantially the same as those in the first and second embodiments, are denoted by the same reference numerals even though they are depicted in different drawings, and a detailed description of the construction and function thereof will thus be omitted because it is considered to be unnecessary.

With reference to FIG. 6, at least one through hole 16 is formed through the lower plate 1 so that the electric wire bracket can be fixed to a wall using a separate fixture, such as a screw, vertically passing through the through hole 16.

Accordingly, the electric wire bracket for solar cells of this embodiment is fixed to the wall by means of the fixture passing through the through hole 16 as well as the adhesive force of the lower adhesive layer 14. Thus, it is possible to prevent the electric wire bracket for solar cells from being easily detached from the wall.

In the electric wire brackets for solar cells in accordance with the various embodiments of the present invention, the insertion paths 3, into which electric wires are inserted, are formed by connecting a pair of the lower and upper plates 1 and 2 provided with the grooves 11 and 12 facing each other and having the adhesive layers 4. Then, the electric wires are inserted into the insertion paths 3 so that a plurality of the wires can be electrically connected. Thereby, it is possible to facilitate the connection of the wires.

As apparent from the above description, the present invention provides an electric wire bracket for solar cells, which includes a pair of upper and lower plates respectively having grooves facing each other, adhesive layers, and conductive parts formed in the grooves so as to electrically connect cores of a plurality of electric wires to the conductive parts, and forms insertion paths, into which the electric wires for supplying power produced by solar cells to electronic instruments are inserted, through the connection of the upper and lower plates by adhering the adhesive layers to each other, thus facilitating the connection of the wires.

The electric wire bracket for solar cells of the present invention further includes a lower adhesive layer and a lower release paper provided on the lower surface of the lower plate, and is thus easily mounted on a wall by adhering the lower adhesive layer to the wall after the lower release paper is removed from the lower plate.

The electric wire bracket for solar cells of the present invention further includes through holes for passing fixtures, such as screws, formed through the lower plate, and is thus more firmly mounted on the wall using the fixtures.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electric wire bracket for solar cells comprising:

a lower plate including at least one groove formed across the upper surface thereof and an adhesive layer formed around the groove;

an upper plate including at least one groove, facing the groove of the lower plate, formed across the lower surface thereof and an adhesive layer formed around the groove;

release papers respectively provided on the upper surface of the adhesive layer of the lower plate and the lower surface of the adhesive layer of the upper plate; and conductive layers, to which cores of electric wires for solar cells, exposed by peeling off sheaths from the wires, are connected, respectively formed in the groove of the lower plate and the groove of the upper plate, wherein at least one insertion path, into which the electric wires for solar cells are inserted, is formed by connecting the lower plate and the upper plate.

2. The electric wire bracket for solar cells according to claim 1, further comprising:

a lower adhesive layer formed on the lower surface of the lower plate; and a lower release paper provided on the lower surface of the lower adhesive layer.

3. The electric wire bracket for solar cells according to claim 1 or 2, wherein the at least one groove includes a plurality of grooves, connected to the conductive layers and facing each other.

4. The electric wire bracket for solar cells according to claim 3, wherein at least one through hole for vertically passing a fixture is formed through the lower plate so that the lower plate can be fixed to a wall using the fixture.

* * * * *

UNITED STATES PATENT AND TRADEMARK OFFICE

CERTIFICATE OF CORRECTION

PATENT NO. : 7,745,727 B2
APPLICATION NO. : 11/769387
DATED : June 29, 2010
INVENTOR(S) : Lim et al.

It is certified that error appears in the above-identified patent and that said Letters Patent is hereby corrected as shown below:

On the title page, Item (75), the Inventors' information is incorrect. Item (75) should read:

-- (75) Inventors: Sang-Hoon Lim, Seo-gu (KR); Young-Heack Kang, Yuseong-gu (KR); Chang-Kyun Yu, Seo-gu (KR); Yil-Sik Cho, Yuseong-gu (KR); Nam-Choon Baek, Yuseong-gu (KR); Gwon Jong Yu, Seocho-gu (KR) --

Signed and Sealed this

Twenty-fourth Day of August, 2010

David J. Kappos

*Director of the United States Patent and Trademark Office*